US006252499B1

(12) United States Patent
Gerdtz et al.

(10) Patent No.: US 6,252,499 B1
(45) Date of Patent: Jun. 26, 2001

(54) FUEL SUPPLY INDICATOR ARRANGEMENT FOR A MOTOR VEHICLE FUEL TANK

(75) Inventors: Uwe Gerdtz, Braunschweig; Jörg Schmidtchen, Meine, both of (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 09/361,897

(22) Filed: Jul. 27, 1999

(30) Foreign Application Priority Data

Jul. 29, 1998 (DE) .............................................. 198 34 165

(51) Int. Cl.[7] ...................................................... B60Q 1/00
(52) U.S. Cl. ...................... 340/450.2; 340/618; 340/936; 701/96; 701/103
(58) Field of Search ................................. 340/450.2, 618, 340/936; 701/96, 103

(56) References Cited

U.S. PATENT DOCUMENTS

| 4,157,030 | * | 6/1979 | Keely ...................................... 73/113 |
| 4,218,744 | * | 8/1980 | Pratt e al. ............................. 364/442 |
| 4,244,210 | | 1/1981 | Prohaska et al. ....................... 73/113 |
| 4,307,452 | | 12/1981 | Mizote .................................. 364/442 |
| 4,412,204 | * | 10/1983 | Pagane ................................... 340/59 |
| 4,546,648 | | 10/1985 | Abt et al. ................................ 73/179 |
| 4,773,260 | * | 9/1988 | Ohno et al. ............................ 73/113 |
| 4,782,699 | * | 11/1988 | Gonze ................................... 73/308 |
| 4,912,646 | * | 3/1990 | Cerruti ................................. 364/509 |
| 4,967,181 | * | 10/1990 | Iizuka et al. ....................... 340/450.2 |
| 5,072,615 | * | 12/1991 | Nawrocki ............................... 73/291 |
| 5,315,867 | * | 5/1994 | Hartel et al. ........................... 73/149 |
| 6,002,328 | * | 12/1999 | Wallrafen .......................... 340/450.2 |

FOREIGN PATENT DOCUMENTS

| 3825630 | 7/1988 | (DE) | ............................. G01F/23/30 |
| 196 10 154 | 3/1996 | (DE) | ............................. B60K/15/06 |
| 196 54 728 | 12/1996 | (DE) | ............................. B60K/19/03 |
| 2120482 | 4/1983 | (GB) | ............................. G01F/23/24 |
| 2124390 | 7/1983 | (GB) | ............................. G01N/23/00 |

\* cited by examiner

*Primary Examiner*—Daniel J. Wu
*Assistant Examiner*—Tai T. Nguyen
(74) *Attorney, Agent, or Firm*—Baker Botts L.L.P.

(57) ABSTRACT

A fuel supply indicator arrangement for a motor vehicle fuel tank includes a device for generating a fuel consumption signal to measure the fuel consumption of an internal combustion engine. A fuel supply indication is provided by an end position switch arrangement in the fuel tank including several end position switches located above a fuel withdrawal point at heights corresponding to predetermined fill levels, the end position switch arrangement being of such configuration that it emits an end position switch signal depending on which of the end position switches is immersed in fuel, and an electric circuit calculates a value for the fuel supply indication from the fuel consumption signal and the end position switch signals.

12 Claims, 1 Drawing Sheet

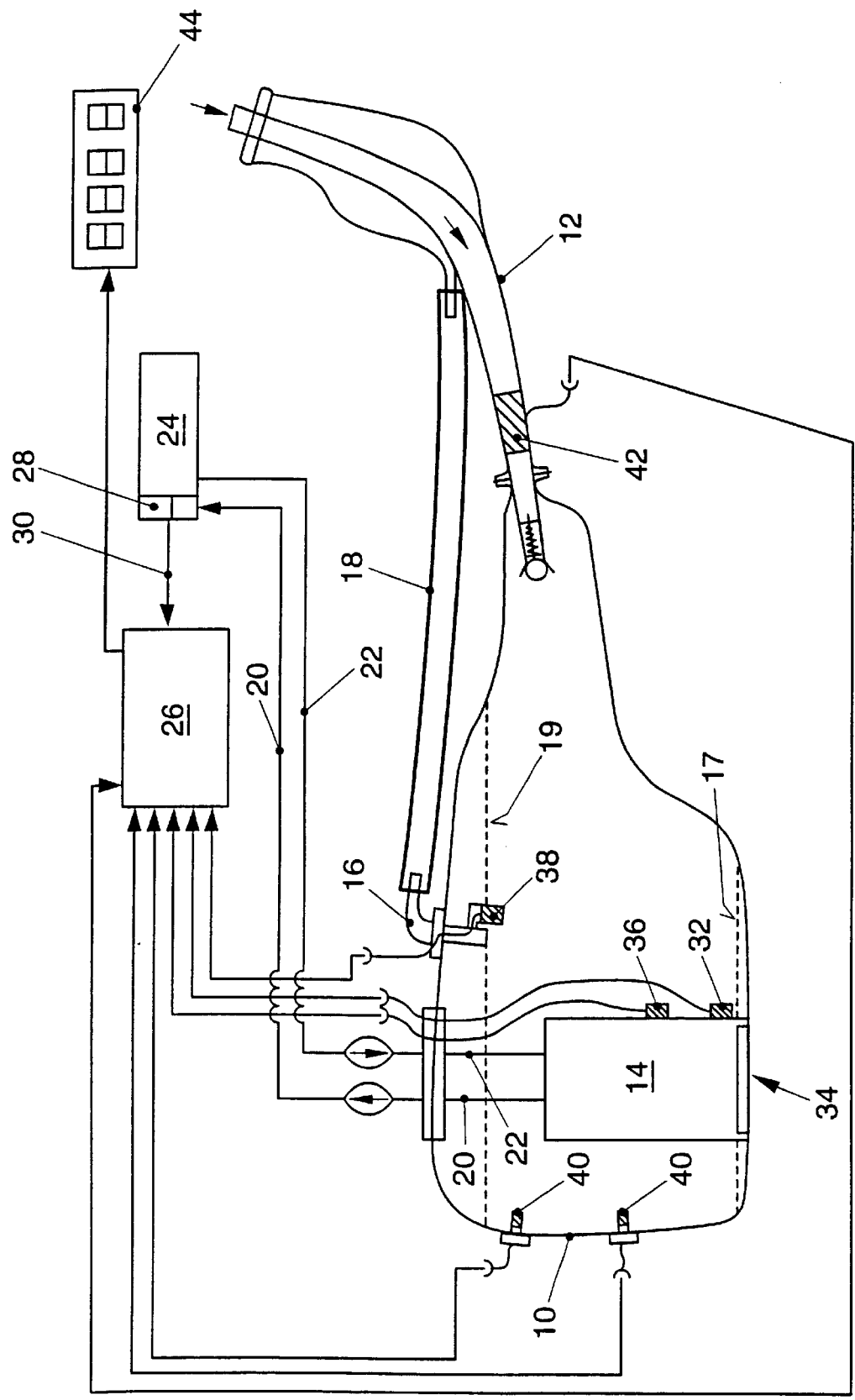

US 6,252,499 B1

FUEL SUPPLY INDICATOR ARRANGEMENT FOR A MOTOR VEHICLE FUEL TANK

BACKGROUND OF THE INVENTION

This invention relates to fuel supply indicators for motor vehicle fuel tanks which include a fuel consumption detector to measure the fuel consumption of an internal combustion engine.

Conventional motor vehicle fuel tanks include a fuel level detector for a fuel supply indicator. The fuel level detector is a lever or dip tube sensor with a float that rises and falls with the fuel level. This reciprocating motion varies a resistance by way of a contact bridge or linkage and consequently varies a current in a circuit, and the current is measured by an instrument which is used to indicate fuel level or fuel supply. The scale of the instrument in the circuit is calibrated in fuel volume. However, one disadvantage of this arrangement is that the fuel supply indication depends also on the inclination of the vehicle, so that a faulty fuel supply indication may result if the vehicle is inclined. Also, with a multichamber fuel tank, a plurality of lever or dip tube sensors is required, with a corresponding increase in cost. Moreover, these sensors only provide indications with gaps of up to five liters.

U.S. Pat. Nos. 4,307,452 and 4,546,648 disclose arrangements for measuring the consumption of fuel by an internal combustion engine but those arrangements provide no indication of the fill level of a fuel tank.

SUMMARY OF THE INVENTION

Accordingly, it is an object of the present invention to provide a fuel supply indicator arrangement for a motor vehicle fuel tank which overcomes disadvantages of the prior art.

Another object of the invention is to provide a fuel supply indicator arrangement producing an improved fuel supply indication which is more reliable in every operating condition of the vehicle.

These and other objects of the invention are attained by providing a fuel supply indicator which includes an end position switch arrangement having at least one end position switch located above a fuel withdrawal point in a fuel tank at a height corresponding to a predetermined fill level, the end position switch arrangement having a configuration such that it provides an end position switch signal dependent upon whether or not an end position switch is immersed in the fuel, along with an electric circuit that computes a value for the fuel supply indicator from a fuel consumption signal combined with each end position switch signal.

This arrangement has the advantage that an exact and reliable indication of the current fuel supply in the fuel tank is obtained in a simple and economical manner. The fuel supply indicator according to the invention is essentially independent of any rated volume of the fuel tank. Instead, the end position switch arrangement, with one or more end position switches, defines fixed points at which the fill level of the fuel tank is reliably indicated. Between these fixed points, the fuel consumption signal is used to provide an accurate fuel supply indication, since that signal is used to determine a volume of fuel withdrawn over time.

In order to provide the vehicle driver with information regarding current operating parameters of a motor vehicle in especially advantageous manner, an indicating instrument is provided that is connected to the electric circuit to display a value representing the fuel consumption and/or a value representing the fuel supply.

In an especially preferred embodiment, the electric circuit is an electronic circuit, in particular a microprocessor or a data processing device.

For an empty fuel tank warning, the end position switch arrangement includes an end position switch for indicating "Empty", which is located at a first height above the fuel withdrawal point which corresponds to a minimal fill level of the fuel tank. This ensures that, even with an "Empty" indication, a certain volume of fuel will remain available for operation of the engine.

Preferably, the end position switch for the "Empty" indication is mounted on a fuel withdrawal unit in the fuel tank.

For a reserve warning indication, the end position switch arrangement includes a "Reserve" end position switch for a reserve indication, located at a second height above the fuel withdrawal point corresponding to a fill level of the fuel tank at or below which a reserve warning signal, such as for example a reserve warning light, is activated.

Desirably, the end position switch for the "Reserve" indication may be mounted on a fuel withdrawal unit in the fuel tank.

For an indication of a full fuel tank, the end position switch arrangement includes "Full" end position switch for a "Full" indication, located at a third height above the fuel withdrawal point corresponding to a maximum fill level of the fuel tank.

In a preferred embodiment the end position switch for the "Full" indication is located on a quick vent nipple in the fuel tank so that the end position switch for the "Full" indication is always at a defined distance from a component which causes termination of operation of a filling nozzle. Thus, in each operating condition, a reliable "Full" indication is always assured.

For example, in the case of fuel tanks having several compartments, the end position switch arrangement includes one additional end position switch located at a fourth height above the fuel withdrawal point which is between the first and third heights.

Preferably, the first height is lower than the second height and the second height is lower than the third height.

A simple and dependable construction is achieved by providing a holder for each end position switch welded into the fuel tank.

To further enhance the accuracy of the fuel supply indication, a fuel flow volume measuring device, such as a through flow meter which emits a fuel fill signal to the electric circuit corresponding to the quantity of fuel that has flowed through the nozzle, is provided in a filling nozzle of the fuel tank and the electric circuit calculates the value for the fuel supply indication taking account of the fuel fill signal.

A further improvement in accuracy of the fuel supply indication when the vehicle is inclined is achieved by providing an inclination sensor that ascertains an angle of inclination of the vehicle, or of the direction of gravity, and provides a corresponding inclination signal to the electric circuit, and an electric circuit which calculates the value of the fuel supply indication taking account of the inclination signal.

BRIEF DESCRIPTION OF THE DRAWINGS

Further objects and advantages of the invention will be apparent from a reading of the following description in conjunction with the accompanying single drawing FIGURE which is a schematic side view illustrating a fuel tank having a representative embodiment of a fuel supply indicator arrangement according to the invention.

DESCRIPTION OF PREFERRED EMBODIMENTS

An important aspect of the invention is the evaluation of several signals from different signal-generating instruments arranged in or on a fuel tank system of a motor vehicle. In the typical embodiment of the invention shown in the drawing a fuel tank having a fuel supply indicator includes a fuel tank 10, a tank nozzle 12, a fuel withdrawal unit 14 and a quick-vent nipple 16 with a vent system 18. A dotted line 17 corresponds to a minimal fill level of the tank and a dotted line 19 designates a maximum fill level of the fuel tank 10.

The fuel withdrawal unit 14 withdraws fuel from the fuel tank 10 by way of a fuel line 20 to a fuel injection system or carburetor 24 of an internal combustion engine (not shown). A second fuel line 22 returns excess fuel from the carburetor or injection system back into the fuel tank 10, thus assuring that the carburetor or fuel infection system 24 and fuel injection valves (not shown), are always supplied with cool fuel.

In addition, an integrated circuit or processor 26 receives a fuel combustion signal 30 from a device 28 which measures fuel consumption. In the illustrated embodiment, the device 28 is integrated into the fuel injection system 24. The processor 26 receives signals from various end position switches that generate corresponding end position switch signals which inform the processor whether or not the corresponding end position switch is immersed in fuel. In the illustrated embodiment, the following end position switches are provided.

A first end position switch 32 for an "Empty" indication is located at a first height above a fuel withdrawal or fuel pump intake point 34 of the fuel withdrawal unit 14 and is mounted on that unit. This ensures that, even when an empty fuel tank is indicated, some fuel will remain available for delivery to the fuel injection system 24.

A second end position switch 36 for a "Reserve" indication is located at a second height above a fuel withdrawal or fuel pump intake point 34 of the fuel withdrawal unit 14. This switch 36 is mounted on the fuel delivery unit 14 and defines a fill level of the fuel tank 10 at or below which a reserve warning light goes on, signaling the driver of the motor vehicle that fuel must be added.

A third end position switch 38 for a "Full" indication is located at a third height above a fuel withdrawal fuel or pump intake point 34 of the fuel withdrawal unit 14. This end position switch 38 is mounted on the quick-vent valve 16 and is welded together with that value into the fuel tank 10. In this way, the end position switch 38 is always at a defined vertical distance from a component defining a fueling switch-off point, and a "Full" indication is always assured.

Other additional end position switches 40 are arranged above the fuel withdrawal point 34 at different heights between the first and third heights. Such additional end position switches 40 are especially required in the case of multi-compartment fuel tanks.

Thus, each individual end position switch 32, 36, 38 and 40 delivers a signal corresponding to a quite specific height, indicating a particular fill condition of the fuel tank. The end position switches 32, 36, 38 and 40 thus define fixed points for the fill level of the fuel tank 10. Fill levels between these fixed points are calculated by the processor 26 using the fuel consumption signal 30. For example, the first height may correspond to a fill level from 0 to 5 liters or from 0 to 7 liters, and the second height to a fill level from 5 to 15 liters or 7 to 10 liters of fuel.

As the fuel tank 10 is being filled up, the end position switches 32, 36, 38 and 40, which are activated successively as the fuel level rises, inform the processor 26 as to the current fill level. To determine a precise fill level between any two of the end switches 32, 36, 38 and 40 upon completion of a filling, a through flow measuring instrument 42 is provided in the tank nozzle 12, by which a volume of fuel which has flowed through, or been "tanked", can be determined. Using the flow volume measured after the last activation of an end position switch 32, 36, 38 or 40, the processor 26 can calculate a fill level lying between two of the end position switches 32, 36, 38 and 40, or above or below the end position switches 32 or 38, respectively. In this way, it is not necessary that the through flow meter 42 should measure an exact value for a large volume to be measured. Instead, it may measure relatively inaccurately, since only small readings of the through flow volume become relevant at any one time. The through flow meter 42 operates, for example, like a volume meter of a tank column at a refueling station, and is preferably a component or pipe carrying fuel and arranged in the tank nozzle 12 or at some other point in the recovery fuel path.

As the fuel tank 10 is gradually emptied during operation of the internal combustion engine, the processor 26 calculates the current fill condition of the fuel tank from the respective end position switch signals together with the fuel consumption signal 30 and supplies a corresponding signal to an indicator 44 which is readable by an operator.

An inclination sensor in the withdrawal unit 14 generates a corresponding correction signal taking account of the fact that the same fill condition of the fuel tank can be represented by different end position switch signals at the processor 26 depending on whether the vehicle is inclined. The processor 26 performs a logic combination of all the aforesaid signals and, with suitable software, produces an output signal for the indicator 44 which may, for example, be in the form of a 'combi' instrument.

In an uncalibrated initial condition, the processor 26 need only wait until the fill level of fuel in the fuel tank 10 passes one of the end position switches 32, 36, 38 and 40, preferably one of the additional end position switches 40. At that point, an automatic self-calibration of the system will take place according to the invention.

Although the invention has been described herein with reference to specific embodiments, many modifications and variations therein will readily occur to those skilled in the art. Accordingly, all such variations and modifications are included within the intended scope of the invention.

We claim:

1. A fuel supply indicator arrangement for a motor vehicle fuel tank comprising:

a device for detecting fuel consumption by an internal combustion engine and providing a fuel consumption signal;

a fuel tank having a tank filling nozzle and a fuel withdrawal unit with a fuel withdrawal point near the bottom of the fuel tank and containing an end position switch means including at least three end position switches disposed above the withdrawal point in the tank and at heights corresponding to predetermined tank fill levels;

the end position switch means providing an end position switch signal when an end position switch is immersed in fuel in the tank; and an electric circuit for calculating a for supply indication value from the fuel consumption signal and end position switch signals wherein the end position switch means comprises an "Empty" end position switch located at a first height above a fuel withdrawal point corresponding to a minimal fill level of the fuel tank, a "Reserve" end position switch located at a second height above the fuel withdrawal point corresponding to a fill level of the fuel tank at or below which a fuel reserve warning signal is activated and a "Full" end position switch located at a third height above the fuel withdrawal point corresponding to a maximum fill level of the fuel tank.

2. A fuel supply indicator arrangement according to claim 1 including an indicating instrument connected to the electric circuit for indicating a fuel consumption value and/or a fuel supply indication value.

3. A fuel supply indicator arrangement according to claim 1 wherein the electric circuit is an electronic circuit containing a data processing device.

4. A fuel supply indicator arrangement according to claim 1 wherein the "Empty" end position switch is located on a fuel withdrawal unit in the fuel tank.

5. A fuel supply indicator arrangement according to claim 1 wherein the "Reserve" end position switch is located on a fuel withdrawal unit in the fuel tank.

6. A fuel supply indicator arrangement according to claim 1 wherein the "Full" end position switch is located on a quick-vent nipple in the fuel tank.

7. A fuel supply indicator arrangement according to claim 1 and including at least one additional end position switch located at a fourth height above the fuel withdrawal point located between the first and third heights.

8. A fuel supply indicator arrangement according to claim 1 wherein the first height is lower than the second height and the second height is lower than the third height.

9. A fuel supply indicator arrangement according to claim 1 wherein each end position switch in the end position switch means is mounted in a bolder welded into the fuel tank.

10. A fuel supply indicator arrangement according to claim 1 including a fuel volume measuring instrument in the tank filling nozzle of the fuel tank which provides a fuel fill signal to the electric circuit corresponding to the volume of fuel which has flowed through the tank filling nozzle and wherein the electric circuit calculates the fuel supply indication value taking account of the fuel fill signal.

11. A fuel supply indicator arrangement according to claim 1 including an inclination sensor in the fuel tank for ascertaining an inclination of the vehicle with respect to vertical and transmitting a corresponding signal to the electric circuit and wherein the electric circuit calculates the fuel supply indication value taking account of the inclination signal.

12. A fuel supply indicator arrangement according to claim 1, including a lever fill level detector for detecting the current fuel fill level in the tank and providing a signal proportional to the fill level and wherein the lever fuel level detector signal is used by the electric circuit to correct the fuel supply indication.

* * * * *